(12) United States Patent
Cho et al.

(10) Patent No.: US 7,830,973 B2
(45) Date of Patent: Nov. 9, 2010

(54) APPARATUS AND METHOD FOR DETECTING PREAMBLE PACKET IN ORTHOGONAL FREQUENCY-DIVISION MULTIPLEXING SYSTEM

(75) Inventors: Sang-In Cho, Daejon (KR); Kyu-Min Kang, Daejon (KR); Cheol-Ho Shin, Daejon (KR); Sang-Sung Choi, Daejon (KR); Kwang-Roh Park, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 528 days.

(21) Appl. No.: 11/930,836

(22) Filed: Oct. 31, 2007

(65) Prior Publication Data

US 2008/0107194 A1 May 8, 2008

(30) Foreign Application Priority Data

Nov. 7, 2006 (KR) ...................... 10-2006-0109556

(51) Int. Cl.
*H04L 27/28* (2006.01)
(52) U.S. Cl. ........................ 375/260; 375/267; 375/343
(58) Field of Classification Search ................. 375/260, 375/267, 343
See application file for complete search history.

(56) References Cited

U.S. PATENT DOCUMENTS

| | | |
|---|---|---|
| 2006/0031740 A1 | 2/2006 | Kidambi et al. |
| 2006/0114812 A1* | 6/2006 | Kim et al. .................. 370/206 |
| 2007/0195914 A1* | 8/2007 | Chang et al. ................. 375/343 |
| 2008/0310561 A1* | 12/2008 | Song et al. ................... 375/343 |

FOREIGN PATENT DOCUMENTS

| | | |
|---|---|---|
| JP | 2003-143106 A | 5/2003 |
| KR | 10-0191326 | 1/1999 |
| KR | 10-2002-0064575 | 8/2002 |
| KR | 2005-0040090 A | 5/2005 |
| KR | 10-0585173 B1 | 5/2006 |
| KR | 2006-0068422 A | 6/2006 |

OTHER PUBLICATIONS

"Detection and Symbol Timing Design and Implementation of Signal Synchronization for Wireless Modem", Seung-Ho Lee et al., *2003 Fall Conference on Korea Information and Communication Society*, pp. 188, 2003.

* cited by examiner

*Primary Examiner*—David B Lugo
(74) *Attorney, Agent, or Firm*—Rabin & Berdo, P.C.

(57) ABSTRACT

There is provided an apparatus for detecting a preamble packet in an orthogonal frequency-division multiplexing (OFDM) system, including: a cross-correlation calculating means for calculating a cross-correlation value between a received signal and previously stored preamble pattern values for an OFDM symbol region (N-point); a delay means for delaying the calculate cross-correlation value as much as a M-point interval; a receiving power measuring means for measuring a receiving power for the guard interval; and a dividing means for calculating a final cross-correlation value by dividing the delayed cross correlation value by the measured power.

4 Claims, 3 Drawing Sheets

APPARATUS AND METHOD FOR DETECTING PREAMBLE PACKET IN ORTHOGONAL FREQUENCY-DIVISION MULTIPLEXING SYSTEM

CROSS-REFERENCE TO RELATED APPLICATIONS

The present invention claims priority of Korean Patent Application No 10-2006-0109556, filed on Nov. 07, 2007, which is incorporated herein by reference.

BACKGROUND OF THE INVENTION

1. Field of the Invention

The present invention relates to an apparatus and method for detecting a preamble packet in an orthogonal frequency-division multiplexing (OFDM) system; and, more particularly, to an apparatus and method for detecting a preamble packet using a final cross-correlation value calculated by calculating a cross-correlation value between a received signal and previously stored preamble pattern values for an OFDM symbol region (N-point), delaying the calculate cross-correlation value as long as a M-point interval, measuring a receiving power for a guard interval, and calculating the final cross-correlation value by dividing the delayed cross correlation value by the measured power.

This work was supported by the Information Technology (IT) research and development program of the Korean Ministry of Information and Communication (MIC) and/or the Korean Institute for Information Technology Advancement (IITA) [2006-S-071-01, "Development of UWB Solution for High Speed Multimedia Transmission"].

2. Description of Related Art

If a transmitter transmits a signal having a preamble packet as the first step of synchronization in an orthogonal frequency-division multiplexing (OFDM) system, the transmitted signal is influenced by noise or multipath environment. If an interference signal exists, a receiver receives the transmitted signal with the interference signal. The receiver determines whether the received signal is a preamble packet signal or not by determining whether the preamble packet is included in the received signal or not.

Such a packet detecting performance depends on how accurately detect an OFDM signal using a received signal which is influenced by noise or multipath environment.

Many conventional methods for detecting a preamble packet in an OFDM system have been introduced. For example, a preamble packet is detected by measuring the power of a received signal or by detecting a preamble pattern of a received signal.

In the conventional method for detecting a preamble packet by measuring the power of a received signal, if a preamble packet is not transmitted from a transmitter, a received signal includes only noises. If a preamble packet is transmitted, a received signal includes a preamble. Therefore, if the received signal includes a preamble, the received signal must have higher energy. That is, the signal energy is zero in a period with only noises, and the signal energy increases in a period of receiving a preamble. A preamble packet can be detected by detecting the increment of signal energy.

In a conventional preamble pattern detecting method, a preamble packet is detected based on whether a predetermined preamble pattern is detected or not in a receiver because the predetermined preamble pattern exists in an OFDM system. That is, a receiver detects a preamble packet by calculating a correlation between a predetermined preamble pattern and a received signal.

However, it is impossible to accurately detect a preamble packet in noise or multipath environment using the conventional packet detecting methods.

SUMMARY OF THE INVENTION

An embodiment of the present invention is directed to providing a an apparatus and method for detecting a preamble packet using a final cross-correlation value calculated by calculating a cross-correlation value between a received signal and previously stored preamble pattern values for an OFDM symbol region (N-point), delaying the calculate cross-correlation value as much as a M-point interval, measuring a receiving power for the guard interval, and calculating a final cross-correlation value by dividing the delayed cross correlation value by the measured power.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an aspect of the present invention, there is provided an apparatus of detecting a preamble packet in an orthogonal frequency-division multiplexing (OFDM) system, including: a cross-correlation calculating means for calculating a cross-correlation value between a received signal and previously stored preamble pattern values for an OFDM symbol region (N-point); a delay means for delaying the calculate cross-correlation value as much as a M-point interval; a receiving power measuring means for measuring a receiving power for the guard interval; and a dividing means for calculating a final cross-correlation value by dividing the delayed cross correlation value by the measured power.

In accordance with another aspect of the present invention, there is provided a method for detecting a preamble packet in an orthogonal frequency-division multiplexing (OFDM) system, including the steps of: a) calculating a cross-correlation value between a received signal and previously stored preamble pattern values for an OFDM symbol region (N-point); b) delaying the calculate cross-correlation value as much as a M-point interval; c) measuring a receiving power for the guard interval; and d) calculating a final cross-correlation value by dividing the delayed cross correlation value by the measured power.

DESCRIPTION OF SPECIFIC EMBODIMENTS

The advantages, features and aspects of the invention will become apparent from the following description of the embodiments with reference to the accompanying drawings, which is set forth hereinafter.

Figure 1:
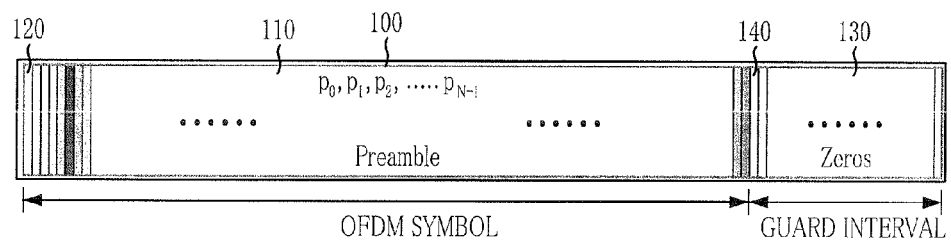
FIG. 1 is a diagram illustrating a preamble packet where the present invention is applied.

FIG. 1 is a diagram illustrating a preamble packet where the present invention is applied.

Referring to FIG. 1, the preamble packet includes N-point data 110 and M-point zeros 130.

An OFDM system detects a packet by transmitting a preamble packet 100 for synchronization. Since the preamble packet is for synchronization, a receiver already knows data having a preamble packet and detects a packet using this information.

The preamble packet includes a predefined preamble pattern 120 inserted into the N-point OFDM symbol 110 as data for synchronization, and a zero value 140 as much as the M-point 130. Since a receiver knows that such a pattern exists in front of a target signal to receive, the receiver can detect a packet by analyzing the pattern of a received signal.

Figure 2:
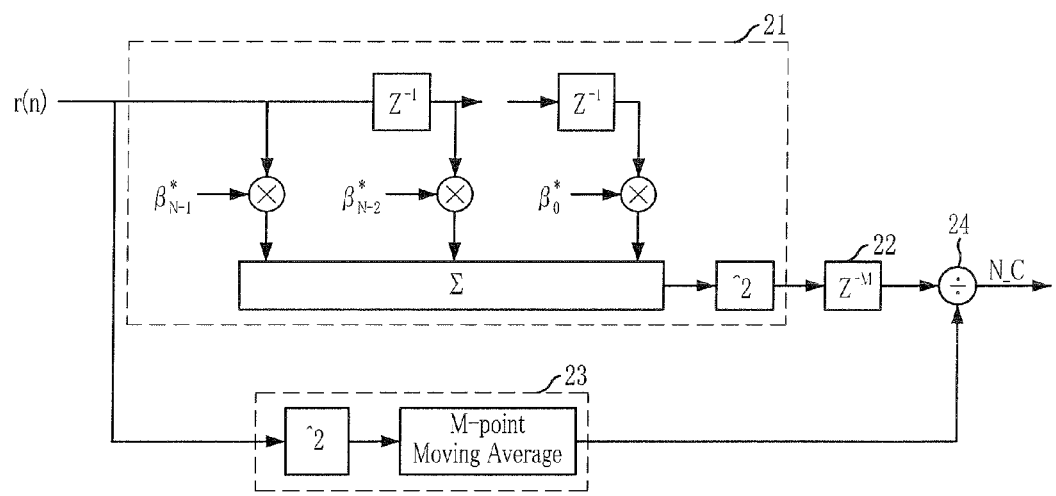
FIG. 2 is a diagram showing an apparatus for detecting a preamble packet in an OFDM system in accordance with an embodiment of the present invention.

FIG. 2 is a diagram showing an apparatus for detecting a preamble packet in an OFDM system in accordance with an embodiment of the present invention.

Referring to FIG. 2, an apparatus for detecting a preamble packet of an OFDM system according to the present embodiment includes a cross-correlation calculator 21, a delay 22, a power measuring unit 23, and a divider 24. The cross-correlation calculator 21 calculates a cross-correlation value between a received signal r(n) and a previously stored preamble pattern value for OFDM symbol interval (N-point). The delay 22 delays the cross-correlation value calculated from the cross-correlation calculator 21 as long as the M-point interval. The power measuring unit 23 measures the power of a received signal during a guard interval. The divider 24 divides the delayed cross-correlation value from the delay 22 by the measure power value from the power measuring unit 23.

The apparatus for detecting a preamble packet according to the present embodiment can accurately detect a preamble packet even in noise and multipath environment using the dividing result from the divider 24.

Figure 3:
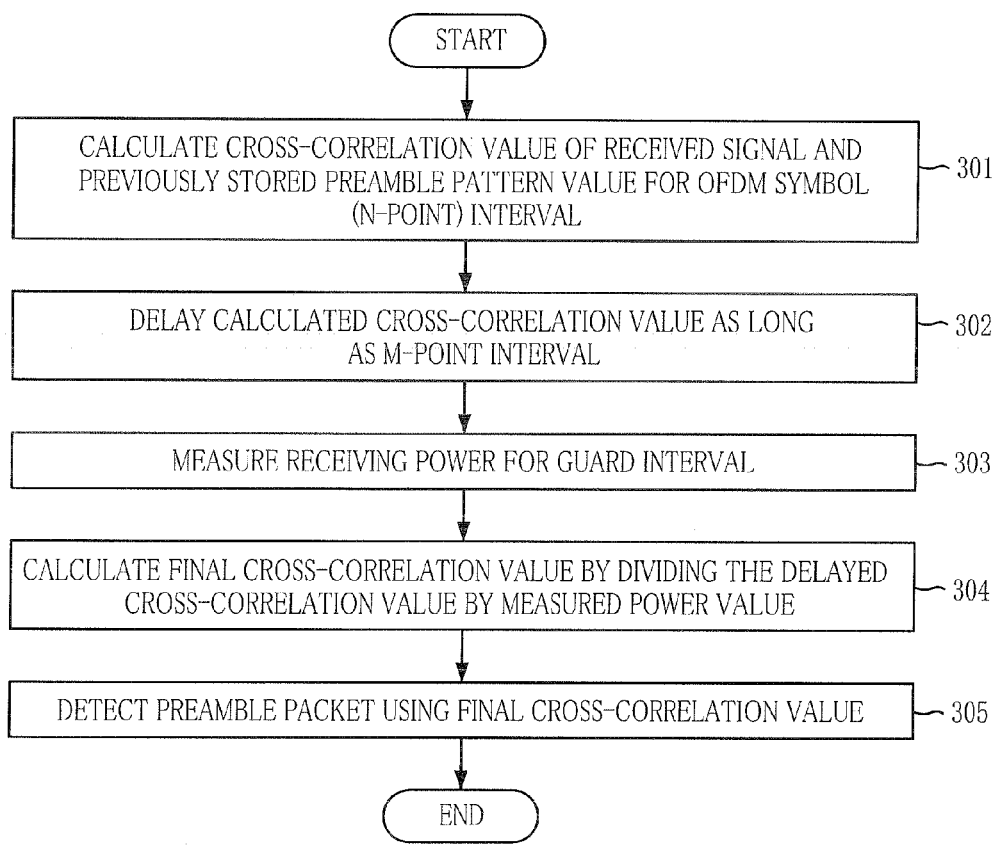
FIG. 3 is a flowchart for describing a method for detecting a preamble packet in an OFDM system in accordance with an embodiment of the present invention.

FIG. 3 is a flowchart for describing a method for detecting a preamble packet in an OFDM system in accordance with an embodiment of the present invention.

At first, a cross-correlation value between a received signal r(n) and a previously stored preamble pattern value for an OFDM symbol interval (N-point) is calculated at step 301.

Then, the calculated cross-correlation value is delayed as long as a guard interval (M-point) at step S302.

At step S303, the power of a received signal is measured during the guard interval.

At step S304, a final cross-correlation value is calculated by dividing the delayed cross-correlation value by the measured poser value.

Then, a preamble packet is detected using the final cross-correlation value at step S305.

In more detail, since the preamble is constituted of N-point data 110 and M-point zeros 130, the final cross-correlation is calculated by dividing it into two parts independently.

At first, a cross-correlation value between a previously known preamble pattern value and received data is calculated for detecting the value of N-point data among a preamble pattern.

Then, the power of a received signal is measured during an M-point interval.

At this time, a signal received at a receiver must be a signal having a predetermined pattern in the N-point interval, and the power of the received signal must be low because the received signal includes 'zero's in the M-point interval thereafter.

Finally, a new cross-correlation value is generated by delaying the signal as long as the M-points and dividing calculated two values, and the new cross-correlation value is used to detect a packet. The new cross-correlation value has a peak value if a preamble pattern exists, and the new cross-correlation value has a bottom value if the preamble pattern dose not exist.

Figure 4:
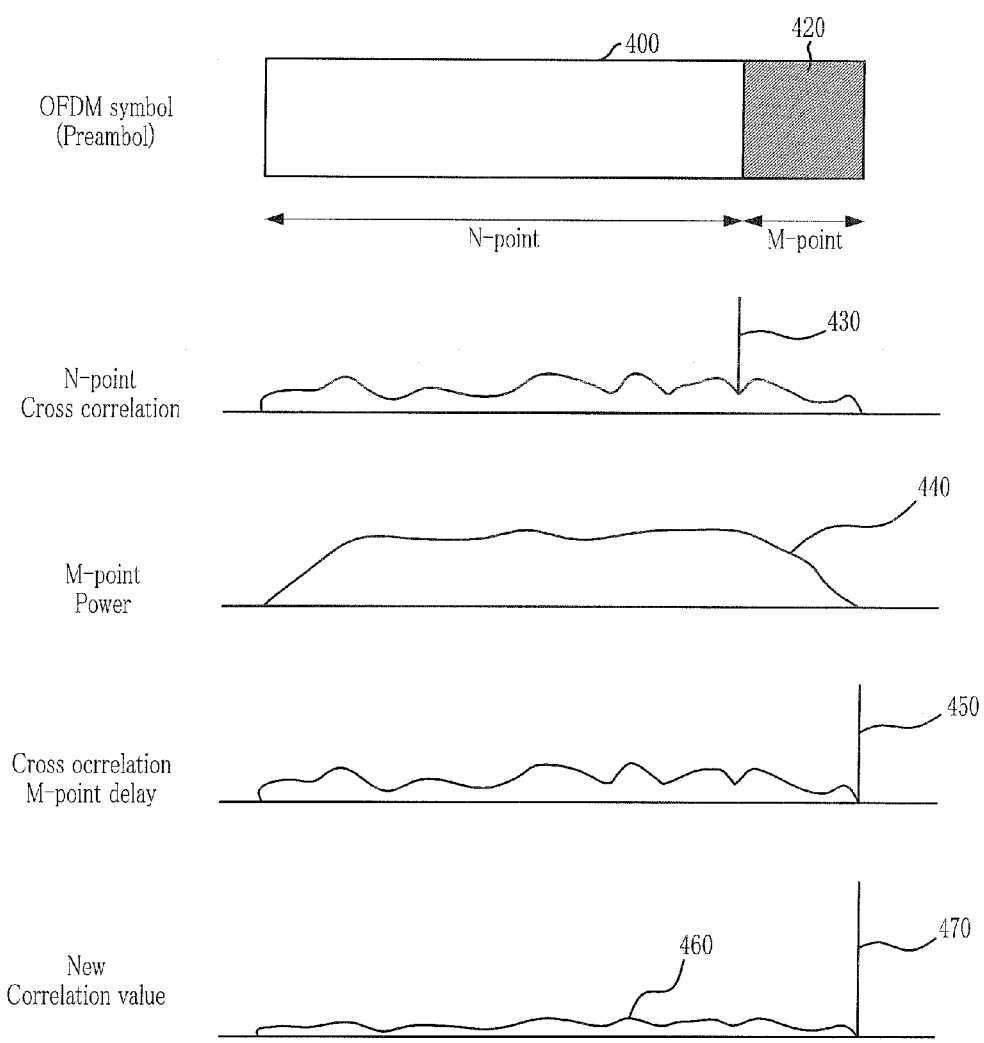
FIG. 4 is a graph illustrating the performance of an apparatus of detecting a preamble packet in an OFDM system in accordance with an embodiment of the present invention.

FIG. 4 is a graph illustrating the performance of an apparatus of detecting a preamble packet in an OFDM system in accordance with an embodiment of the present invention.

If a cross-correlation value between a signal 400 having a preamble pattern 410 and the previously known preamble value is calculated, the cross-correlation value has a peak value 430.

If the power of a received signal is measured during an M-point interval (440), the cross-correlation value has a small value in a region having the M-point interval, and the cross-correlation value has a large value in a region having the N-point interval.

The calculated cross-correlation value 430 is delayed as long as M-point (450) and the delayed cross-correlation value is divided by the measured power value 440, thereby obtaining new cross-correlation values 460 and 470.

If a preamble pattern is not synchronized, the new cross-correlation value has a bottom value 460. On the contrary, if a preamble pattern is synchronized, the new cross-correlation value has a peak value 470.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

While the present invention has been described with respect to certain preferred embodiments, it will be apparent to those skilled in the art that various changes and modifications may be made without departing from the spirits and scope of the invention as defined in the following claims.

As described above, the apparatus and method for detecting a preamble packet in an OFDM system can accurately detect a preamble packet even in noise or multipath environments by calculating a cross-correlation value between a received signal and previously stored preamble pattern values for an OFDM symbol region (N-point), delaying the calculate cross-correlation value as much as a M-point interval, measuring a receiving power for the guard interval, and calculating a final cross-correlation value by dividing the delayed cross correlation value by the measured power.

The preamble packet detection apparatus and method according to the present invention can accurately detect a preamble packet although an interference signal exists or although the signal power is low by detecting a preamble packet using a final cross-correlation value that is calculated by calculating a cross-correlation value between a received signal and previously stored preamble pattern values for an OFDM symbol region (N-point), delaying the calculate cross-correlation value as much as a M-point interval, measuring a receiving power for the guard interval, and calculating the final cross-correlation value by dividing the delayed cross correlation value by the measured power.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

What is claimed is:

1. An apparatus for detecting a preamble packet in an orthogonal frequency-division multiplexing (OFDM) system, comprising:
   a cross-correlation calculating means for calculating a cross-correlation value between a received signal and previously stored preamble pattern values for an OFDM symbol region (N-point);
   a delay means for delaying the calculation of cross-correlation value as much as an M-point interval;
   a receiving power measuring means for measuring a receiving power for the guard interval; and
   a dividing means for calculating a final cross-correlation value by dividing a delayed cross correlation value by the measured power.

2. The apparatus of claim 1, wherein the final cross-correlation value has a peak value when a preamble pattern is accurately synchronized, and the final cross-correlation value has a bottom value when a preamble pattern is not accurately synchronized.

3. A method for detecting a preamble packet in an orthogonal frequency-division multiplexing (OFDM) system, comprising the steps of:
   a) calculating a cross-correlation value between a received signal and previously stored preamble pattern values for an OFDM symbol region (N-point);
   b) delaying the calculation of cross-correlation value as much as an M-point interval;
   c) measuring a receiving power for the guard interval; and
   d) calculating a final cross-correlation value by dividing a delayed cross correlation value by the measured power.

4. The method of claim 3, wherein the final cross-correlation value has a peak value when a preamble pattern is accurately synchronized, and the final cross-correlation value has a bottom value when a preamble pattern is not accurately synchronized.

* * * * *